United States Patent [19]
Cross

[11] Patent Number: 5,820,071
[45] Date of Patent: Oct. 13, 1998

[54] MECHANICAL COUPLER/DECOUPLER

[75] Inventor: Peter J. Cross, Mesa, Ariz.

[73] Assignee: McDonnell Douglas Helicopter Company, Mesa, Ariz.

[21] Appl. No.: 711,450

[22] Filed: Sep. 5, 1996

[51] Int. Cl.$^6$ .................... B64C 13/12; B64C 13/32
[52] U.S. Cl. .................... 244/17.13; 244/221; 244/229; 244/234; 74/491
[58] Field of Search .................... 244/17.13, 220, 244/221, 226, 227, 229, 232, 234, 236, 75 R, 76 R, 194, 195; 318/563, 566; 74/491, 531

[56] References Cited

U.S. PATENT DOCUMENTS

| | | | |
|---|---|---|---|
| 3,405,337 | 10/1968 | Popik | 318/563 |
| 3,485,463 | 12/1969 | Miller | 318/566 |
| 3,599,510 | 8/1971 | Scott, Sr. | 244/234 X |
| 3,611,828 | 10/1971 | Maroshick | 244/229 X |
| 3,902,379 | 9/1975 | Bennett et al. | 244/220 X |
| 4,171,113 | 10/1979 | Townsend | 244/221 |
| 5,538,209 | 7/1996 | Bowden et al. | 244/221 |

Primary Examiner—William Grant
Attorney, Agent, or Firm—Snell & Wilmer

[57] ABSTRACT

A coupler/decoupler is suitable for connecting one mechanical system to another and, upon application of sufficient force, resettably disengaging the first mechanical system from the second. In particular, the coupler/decoupler couples the pilot's or co-pilot's controls to the primary flight control system in a helicopter. In the event that the primary flight control system jams, applying a selected force to the controls causes the coupler/decoupler to disengage the primary flight control system, allowing the control to move again. In addition, the coupler/decoupler is configured to transmit a signal when the primary flight control system is disengaged, which activates a backup flight control system.

26 Claims, 6 Drawing Sheets

MECHANICAL COUPLER/DECOUPLER

BACKGROUND OF THE INVENTION

1. Field of the Invention

The invention relates to mechanical control systems, and more particularly, systems for coupling and decoupling pilot controls to and from aircraft actuators.

2. Description of the Related Art

In many applications, particularly aviation, failure of a control system can have catastrophic consequences. To avoid disastrous failures, many designs include redundancies, such as a backup control system, to assume control in the event of primary system failure. The secondary system normally operates on different principles than the primary system to avoid breakdowns that may affect both the primary and the secondary systems.

For example, a helicopter typically includes a primary and backup control system for the various flight controls. For military craft, the primary control system is often a mechanical system, giving the pilot a mechanical link to the flight control actuators associated with the main and tail rotors. In the event that the primary control system jams, however, a secondary system, either mechanical or electrical, activates. With an electronic system, signals are received from the pilot through the pilot's controls, but the signals are provided to the actuators using electronic or optic links.

Ensuring that the secondary system may be activated quickly by the pilot poses a significant design problem. It is desirable to have the activation mechanism for the secondary system accessible to the pilot so that it can be quickly and easily engaged, and even automatically if possible. On the other hand, the activation mechanism should not be so easily engaged that the pilot or maintenance personnel might inadvertently activate the secondary system while the primary system still functions. In addition, the activation mechanism should be reliable and easily maintained to prevent human errors from disabling or damaging it.

A current mechanism for activating the backup control system for a helicopter operates in conjunction with a shear pin and a microswitch. The shear pin maintains the mechanical connection to the mechanical primary control system during normal operation. In the event of a jam, however, the mechanical system locks up, rendering the pilot's controls substantially immobile. To engage a secondary system, the pilot applies enough force to the control (whether it is a stick, pedal, or other manual control) to break the shear pin. The shear pin is configured to break when a selected amount of force is applied. When the shear pin breaks, the affected pilot control decouples from the jammed mechanical system, allowing the pilot to move the control relatively freely. In addition, the backup system activating mechanism includes a microswitch which detects when the shear pin breaks, at which time the switch generates an electrical signal. The electrical signal indicates that the mechanical primary system has been disengaged and activates the electrical or optical backup system.

Although the shear pin mechanism offers an effective system for disengaging the primary control system and activating the backup control system, certain aspects of the system present various drawbacks. For example, to operate properly, the appropriate pin must be inserted into the system and accurately aligned. If a solid pin is used instead of a shear pin, the pin cannot break and the pilot cannot engage the backup system. Similarly, if the pin is not properly aligned, it may present excessive resistance to breaking, again effectively preventing engagement of the backup system. On the other hand, the shear pin should not break unless the backup system is desired. For example, when encountering hostile fire or avoiding a potential collision, the pilot may place considerable force on the controls to exercise an extreme maneuver. In this event, the shear pin may break and engage the backup system while the primary system is still operable.

In addition, the microswitch component of the activation system must be carefully adjusted to ensure proper operation and activation of the backup system. In particular, if the microswitch is out of position, the reliability of the backup system diminishes dramatically.

Further, testing for correct shear pin activation cannot be performed without breaking the shear pin. Consequently, to reset the activation mechanism, the shear pin must be replaced which, as discussed above, may affect the reliability of the system. Thus, the activation mechanism cannot be effectively tested from end to end.

SUMMARY OF THE INVENTION

A backup activation system according to various aspects of the present invention presents a system for disengaging the primary system and activating the backup system. The present system does not rely on fracturing shear pins to disengage the primary system, but instead provides a mechanical coupler/decoupler for disengaging the pilot control from its associated primary mechanical flight control system in the case of a jam of that specific control system. In addition, the coupler/decoupler of the present invention is easily and quickly resettable and testable without the need to replace parts (such as shear pins).

In particular, a coupler/decoupler according to various aspects of the present invention comprises an input lever connected to the pilot's controls and an output arm connected to a linkage transmitting motions to an input lever of the flight actuators. In one embodiment, the coupler/decoupler includes a biasing mechanism, which creates a threshold force at which the coupler/decoupler decouples the pilot's controls from the primary system by disengaging the mechanism input lever from the output arm of the mechanism. If the force applied to the input lever is below the threshold force, the force is transferred through the output arm to the flight actuators in normal operation. When the force applied at the input lever exceeds the threshold force, for example in the event of a jammed control, the coupler/decoupler decouples the pilot controls from the flight actuators. In addition, the coupler/decoupler may be configured to activate the backup system substantially simultaneously with the disengagement of the primary control system.

BRIEF DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which:

DETAILED DESCRIPTION OF THE EXEMPLARY EMBODIMENT

Figure 1:
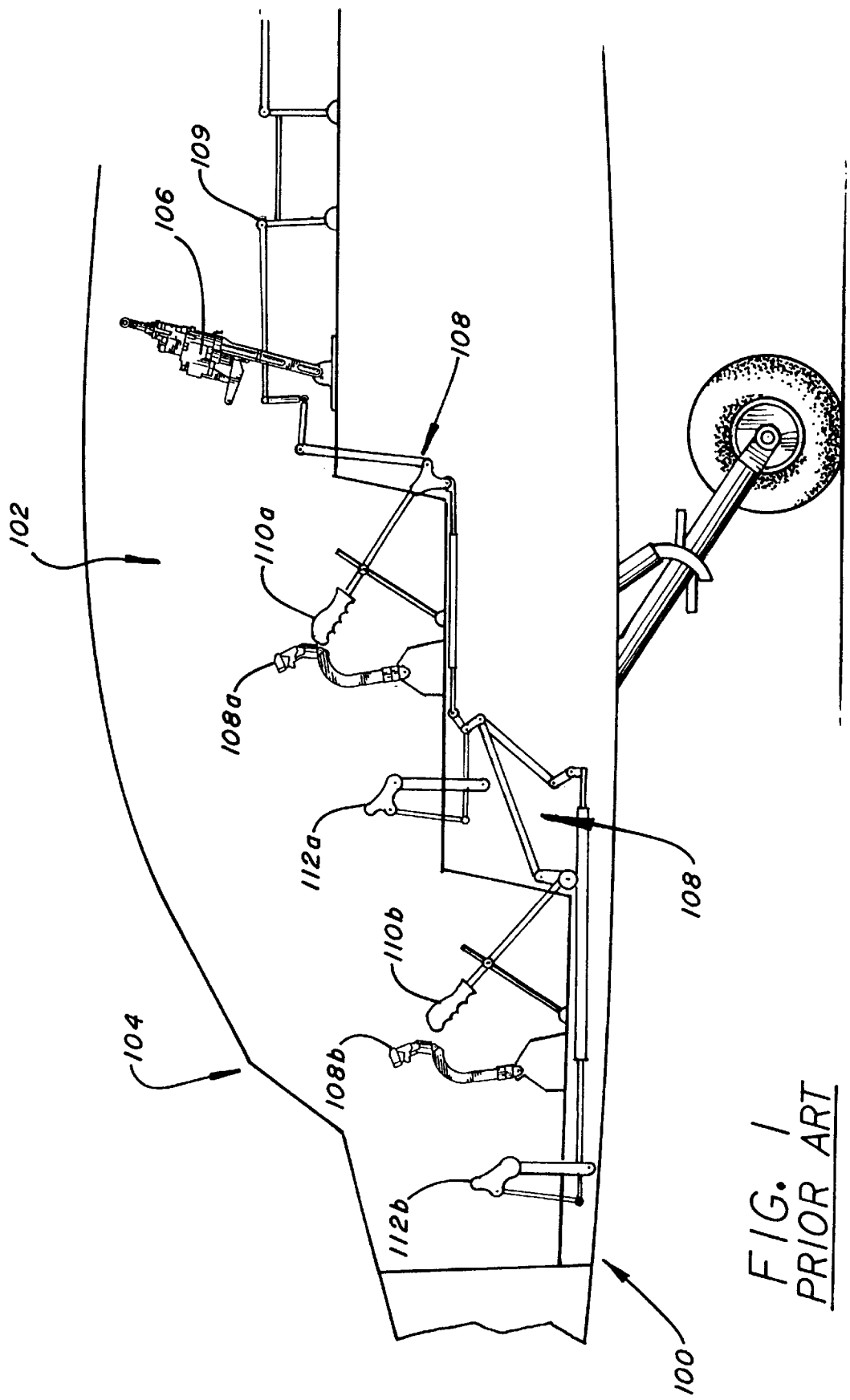
FIG. 1 is a cross sectional, conceptual view of a helicopter and controls for a pilot and co-pilot.

A coupler/decoupler according to various aspects of the present invention provides a suitable system for disengaging the primary controls of an aircraft and engaging a backup control system. Referring now to FIG. 1, a coupler/decoupler is suitably integrated into the flight control system of a helicopter 100. The flight control system of the helicopter 100 includes a set of pilot controls 102, a set of co-pilot controls 104, at least one coupler/decoupler according to various aspects of the present invention (not shown), a set of flight actuators 106, a primary actuator control system 108, a tail rotor actuator control system 109, and a backup actuator control system (not shown). The pilot controls 102 and co-pilot controls 104 suitably comprise conventional helicopter flight controls, including a cyclic control 108A–B, having a longitudinal axis and a lateral axis, a collective control 110A–B, and a directional control 112A–B. Both the pilot controls 102 and the co-pilot controls 104 are utilized by their respective operators to direct and control the helicopter 100.

Motion of the various controls 102, 104 causes various actuators 106 to react correspondingly, thus controlling the helicopter's 100 flight. Initially, pilot controls 102 and co-pilot controls 104 control the flight actuators 106 through the primary actuator control system 108, which, in the present embodiment, preferably comprises a mechanical link to the flight actuators 106. Each of the individual pilot and co-pilot controls 102, 104 operates independently of the other controls, and is suitably connected to the primary actuator control system 108 through a coupler/decoupler. Thus, the helicopter 100 is suitably equipped with eight coupler/decouplers: a longitudinal cyclic coupler/decoupler, a lateral cyclic coupler/decoupler, a collective coupler/decoupler, and a directional coupler/decoupler, for both the pilot controls 102 and co-pilot controls 104.

All of the relevant flight actuators 106 are also selectably coupled to the pilot and copilot controls 102, 104 through the backup actuator control system. The backup actuator control system suitably provides a secondary control link between the pilot's and co-pilot's controls 102, 104 and the flight actuators 106. In addition, the backup actuator control system suitably operates on different principles than the primary actuator control system 108 to reduce the likelihood that any single problem will affect both the primary and the backup actuator control systems. For example, a suitable backup actuator control system comprises an electrical system, such as an LED sensor, which senses and then converts motion of the pilots or co-pilot's controls 102, 104 into electrical signals which are used to electronically control the flight actuators 106.

Initially, the backup actuator control system is not engaged so that the flight actuators 106 are controlled only through the primary actuator control system 108. In the event that a portion of the primary actuator control system 108 jams, the pilot or co-pilot controls 102, 104 corresponding to the jammed portion are suitably disengaged from the pilot controls of the primary actuator control system 108, and the relevant portion of the backup actuator control system is engaged. In the present embodiment, the coupler/decoupler provides for disengaging a portion of the primary actuator control system 108 and activating the associated portion of the backup actuator control system.

Figure 2:
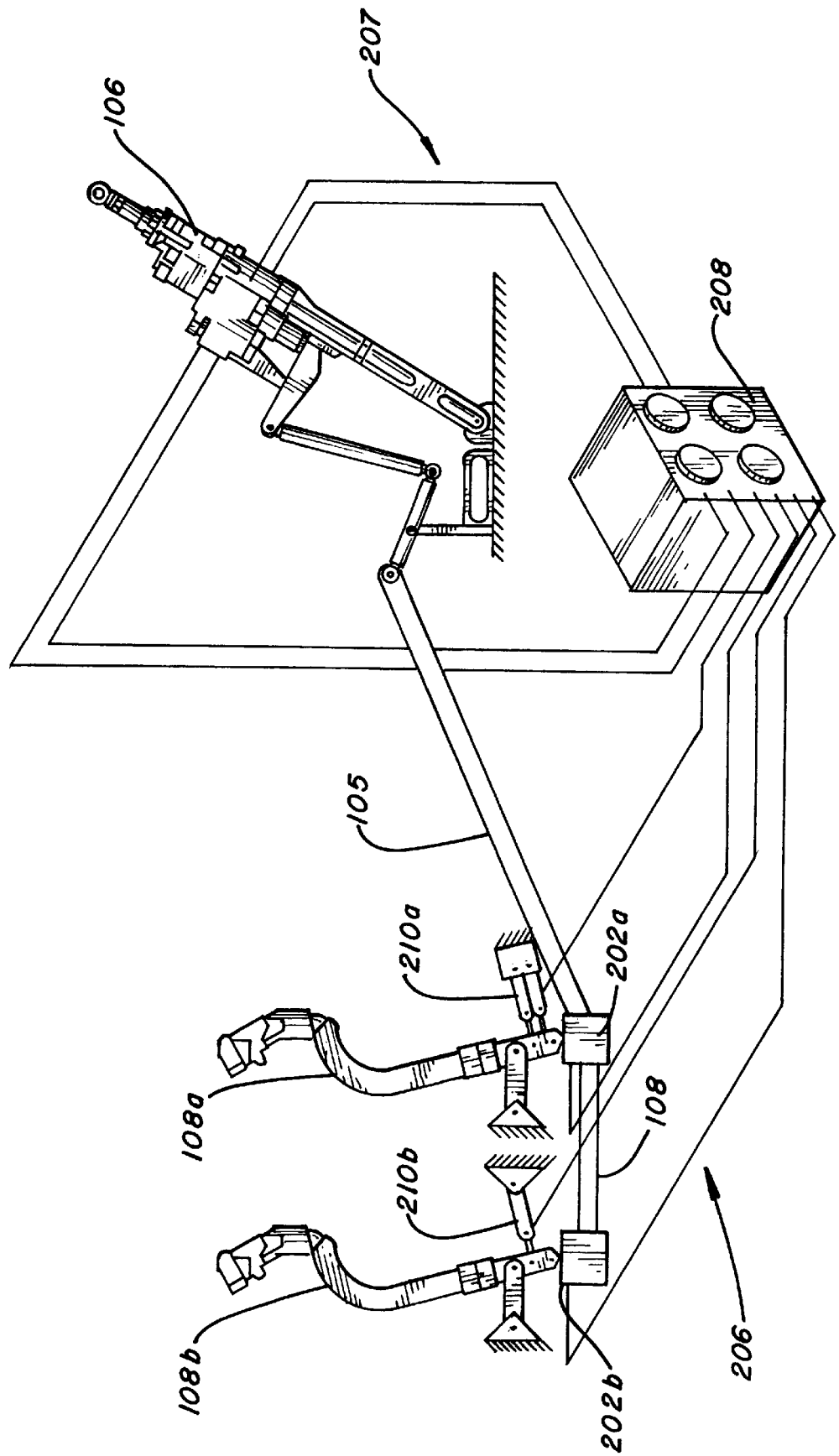
FIG. 2 illustrates primary and backup actuator control systems for connecting the pilot and co-pilot controls to the flight actuators.
Figure 3:
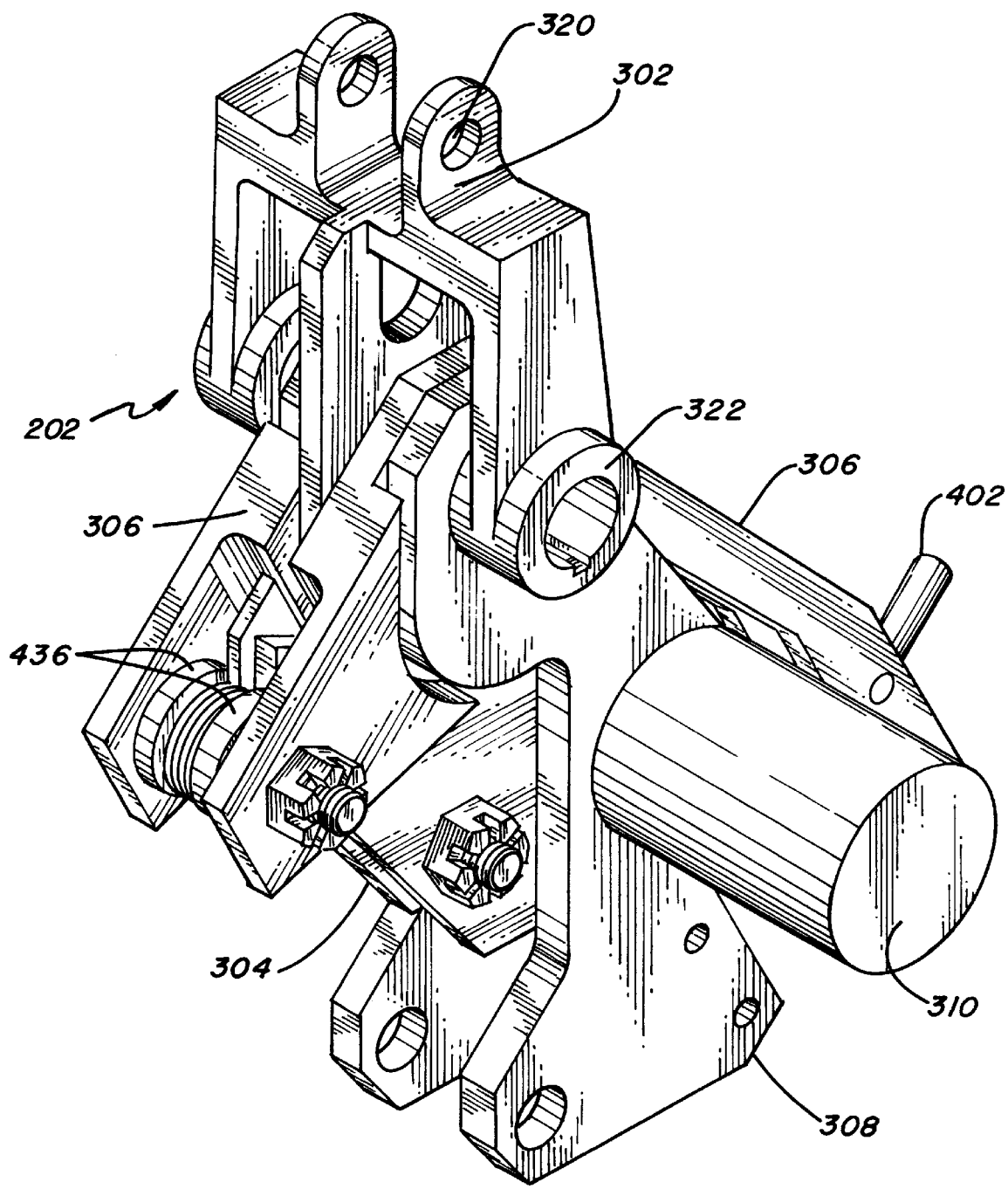
FIG. 3 is an elevational and oblique view of a coupler/decoupler according to various aspects of the present invention.
Figure 4A:
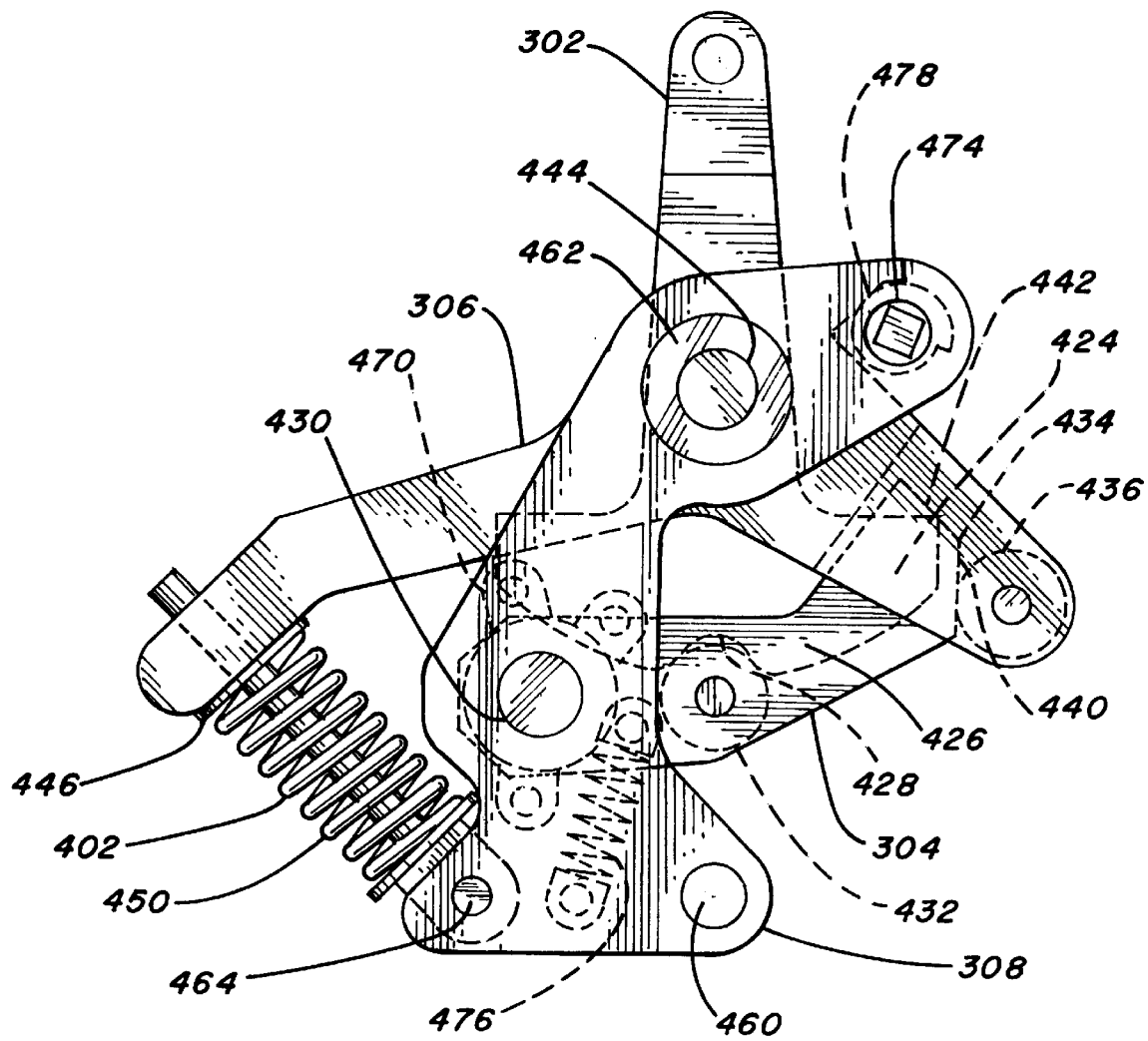
FIGS. 4A–C are elevational views of the coupler/decoupler of FIG. 3 in a lock-in position, an intermediate position between the lock-in and lock-out positions, and a lock-out position, respectively, with portions hidden from view outlined with broken lines.
Figure 4B:
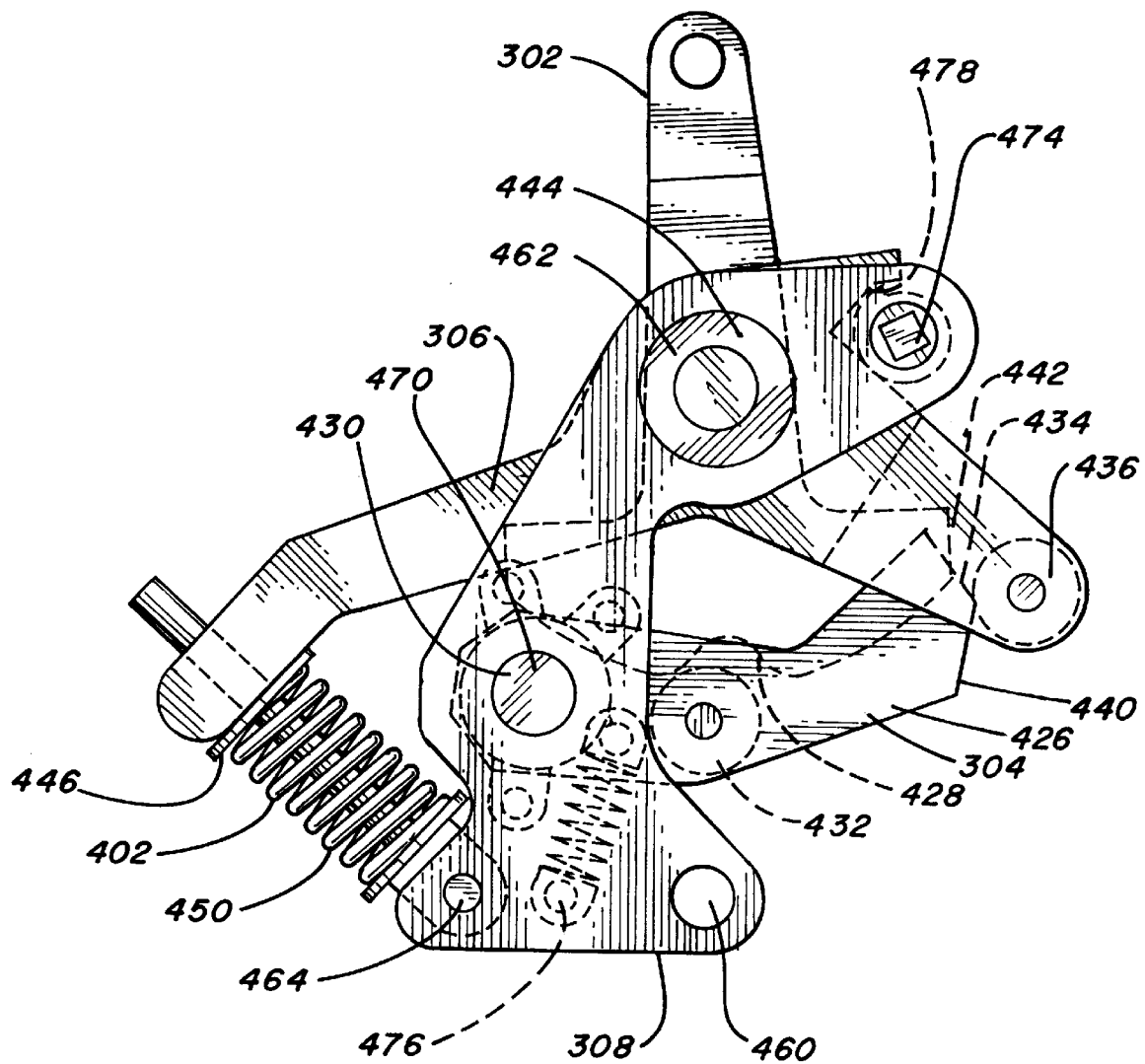
Figure 4C:
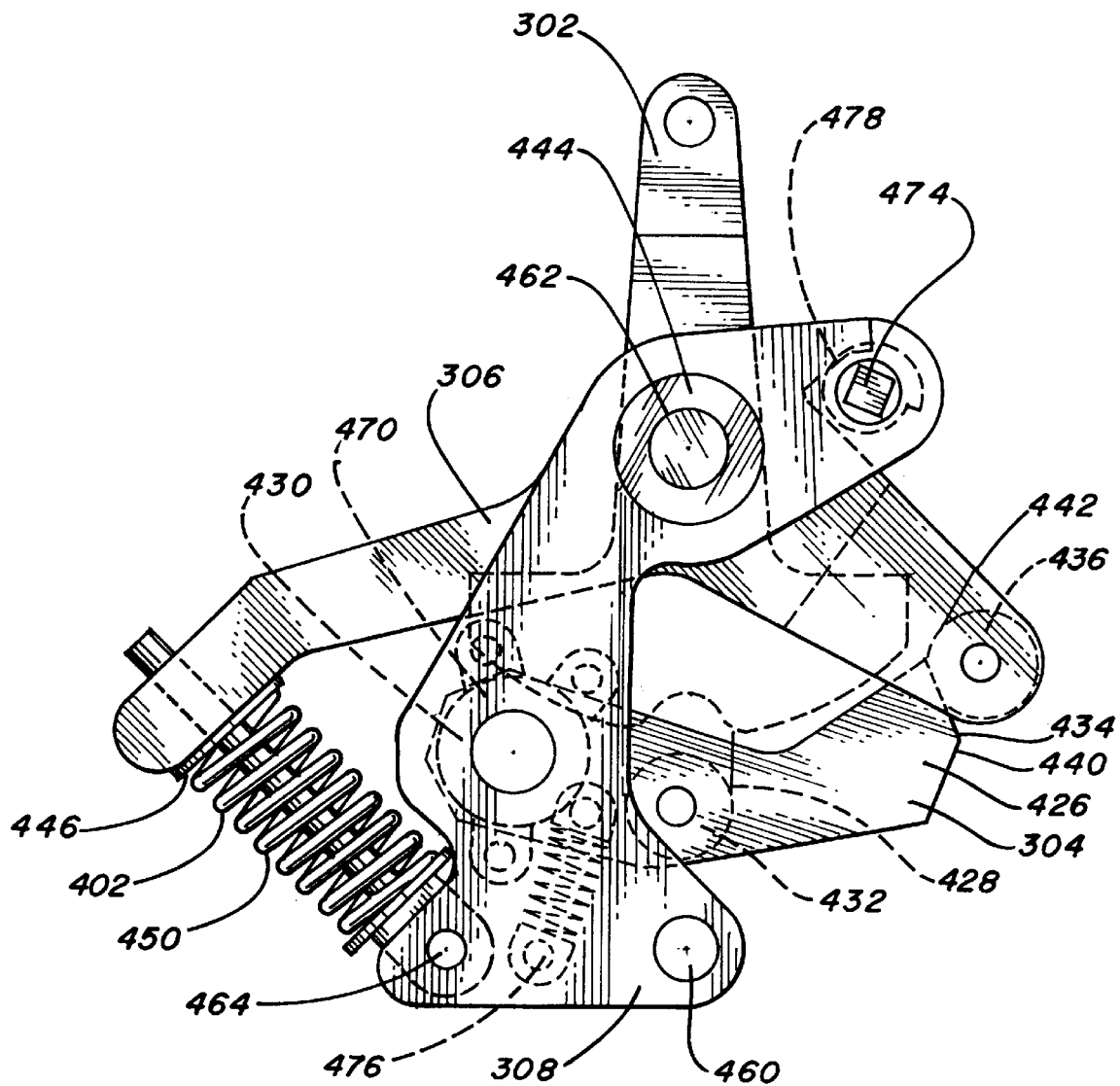

For example, referring now to FIG. 2, an exemplary embodiment including a coupler/decoupler integrated into the helicopter 100 includes the pilot's and co-pilot's longitudinal cyclic controls 108A-B; a pair of respective associated coupler/decouplers 202A–B; a mechanical primary actuator control system 108; a backup actuator control system including a sensing system 206 from the controls, a signal system 207 to the actuators and a flight management computer 208; and an actuator 106. The pilot's cyclic 108A and copilot's cyclic 108B are coupled to the primary actuator control system 108 through first and second coupler/decouplers 202A–B, respectively, for example at the bottom of each cyclic control stick 108A–B. The primary actuator control system 108 suitably comprises rigid mechanical links connected to the actuator for mechanically controlling the actuator 106, such as actuators associated with the main or tail rotor.

In the event of a jammed control, for example the pilot's cyclic 108A, in the primary actuator control system 108, the pilot applies force to the cyclic 108A which decouples the cyclic 108A from the primary actuator control system 108 when a threshold amount of force is applied. Coupler/decoupler 202A is connected to the flight management computer 208, so that when the coupler/decoupler 202A decouples the cyclic 108A from the primary actuator control system 208, the coupler/decoupler 202A also provides a signal to the flight management computer 208 through 206 to activate the backup actuator control system 207. When the coupler/decoupler 202A disengages the cyclic 108A from the primary actuator control system 108, cyclic 108A, moves relatively freely. The motion of the cyclic 108A, however, is monitored by a transducer 210A associated with the cyclic 108A, however, transducer 210A generates signals corresponding to the movement of the cyclic 108A, which are transmitted through sensing system 206 to the flight management computer 208. The flight management computer 208 provides electrical control signals through sensing system 207 to the actuators 106 based on the signals received from the transducer 210A, thus effectively controlling the helicopter 100.

To facilitate the disablement of the primary actuator control system 108 and engage the backup actuator control system 206, 207, the coupler/decoupler 202A–B according to various aspects of the present invention decouples the cyclic 108A from the primary actuator control system 108 and generates an activation signal 206 to the flight management computer 208 to activate the backup actuator control system 207. Referring now to FIGS. 3 and 4A–C, a coupler/decoupler 202 according to various aspects of the present invention comprises: an input lever 302; a rocker arm 304; a loading arm 306; an output arm 308; a biasing mechanism 402; and a sensor 310. Input lever 302 reacts to input applied to input lever 302 from a control system, such as the helicopter pilot's cyclic 108A. Input may be received from the pilot's or co-pilot's longitudinal cyclic, lateral cyclic, collective, or directional controls, or from any control or source.

Input lever 302 receives input from the pilot's cyclic 108A and transfers the input to the other components of coupler/decoupler 202. Input lever 302 suitably comprises: an input connector 320; a decoupler pivot 322; and a drive cam 424. Input connector 320 suitably comprises a mechanical connection to the input controls, such as the pilot's cyclic 108A. In particular, input connector 320 may comprise a pivoting connection, such as a pin joint, joining input lever 302 to the pilot's cyclic 108A through a control link (not shown). Input lever 302 substantially freely rotates about decoupler pivot 322 in response to input at input connector 320. Drive cam 424 is a suitable interface (roller 432) thereby engaging rocker arm 304. For example, drive cam 424 comprises a bell crank 426 rigidly formed as part of input lever 302. Bell crank 426 further suitably includes a detent 428 formed in the outer surface of bell crank 426 opposite input connector 320. Detent 428 is formed to engage and detain a rocker arm roller 430 associated with rocker arm 304. Thus, force applied to input lever 302 from the pilot's cyclic 108A is transferred via decoupler pivot 322 to drive cam 424. Drive cam 424 then suitably applies the transferred force to rocker arm 304. The depth and shape of detent 428 may be modified for various applications. For example, detent 428 may have one deep, steep side to prevent movement of rocker arm roller 430 in the direction of that side, so that only movement in the opposite direction activates the lockout position of coupler/decoupler 202. Movement can be in either direction.

Rocker arm 304 is suitably configured to transfer force from input lever 302 to loading arm 306 and output arm 308. In addition, rocker arm 304 is suitably configured to disengage input lever 302 under selected conditions, for example jamming of flight actuators 106. In the present embodiment, rocker arm 304 suitably comprises: a rocker arm pivot 430; a rocker arm roller 432; and a cam surface 434. Rocker arm pivot 430 is disposed near the end of rocker arm 304, and rocker arm 304 is preferably configured to rotate substantially freely about rocker arm pivot 430. Rocker arm pivot 430 is further suitably connected to sensor 310. For example, rocker arm pivot 430 may be connected to sensor 310 such that rotation of rocker arm 304 beyond a predetermined threshold activates sensor 310.

Rocker arm roller 432 is suitably configured to engage detent 428 formed in bell crank 426 when rocker arm 304 is biased towards input lever 302 and detent 428 is positioned opposite rocker arm roller 432. Rocker arm roller 432 is suitably positioned on rocker arm 304 between rocker arm pivot 430 and cam surface 434 such that force applied to rocker arm roller 432 by input lever 302 biases cam surface 434 against loading arm 306. When rocker arm roller 432 is engaged by input lever 302, rocker arm roller 432 remains positioned within detent 428 and transfers force applied to rocker arm roller 432 by input lever 302 to rocker arm 304. Rocker arm roller 432 is configured, however, to roll out of detent 428 when the resistance of loading arm 306 exceeds a selected threshold force.

Cam surface 434 engages loading arm 306 to transfer force applied to rocker arm 304 to loading arm 306. For example, cam surface 434 suitably engages a loading lever roller 436 associated with loading arm 306. In this configuration, force applied to rocker arm roller 432 in the lock-in position biases cam surface 434 against load lever roller 436. Cam surface 434 is suitably formed on an end of rocker arm 304 opposite rocker arm pivot 430. In the present embodiment, cam surface 434 includes a lock-in cam surface 440 and a lock-out cam surface 442. Lock-in cam surface 440 is preferably formed so that force applied to lock-in cam surface 440 biases rocker arm 304 towards input lever 302. For example, load lever roller 436 is suitably biased towards cam surface 434, so that when lock-in cam surface 440 engages load lever roller 436, rocker arm roller 432 is biased towards bell crank detent 428. Lock-out cam surface 442, on the other hand, is preferably formed so that when force is applied to lock-out cam surface 442 by load lever roller 436, rocker arm 304 is biased away from input lever 302.

In the lock-in position, rocker arm roller 432 remains within bell crank detent 428, and force applied to input lever 302 is transferred to rocker arm 304. Rocker arm 304 transfers the force to loading arm 306. If loading arm 306 resists the force applied by rocker arm 304, however, rocker arm 304 resists the force applied by input lever 302. As a result, rocker arm roller 432 tends to roll out of bell crank detent 428, forcing rocker arm 304 away from input lever 302 and causing loading lever roller 436 to roll on cam surface 434. If rocker arm roller 432 only rolls slightly away from the center of detent 428, loading lever roller 436 rolls only slightly along lock-in cam surface 440 and continues to bias rocker arm 304 towards input lever 302. If the force applied to input lever 302 exceeds a selected threshold, however, rocker arm roller 432 moves far enough away from the center of bell crank detent 428 to force loading lever roller 436 to roll to the boundary separating lock-in cam surface 440 and lock-out cam surface 442. As loading lever roller 436 crosses the cam surface 434 boundary, the resistance force applied by loading arm 306 biases rocker arm 304 away from input lever 302 so that rocker arm roller 432 disengages detent 428. Consequently, rocker arm 304 pivots around rocker arm pivot 430 away from input lever 302, thus disengaging input lever 302 and placing coupler/decoupler 202 in the lock-out position.

In addition to loading lever roller 436, loading arm 306 suitably comprises a loading arm pivot 444 and a biasing surface 446. Loading arm pivot 444 is suitably coaxial with decoupler pivot 322. In the absence of other forces, loading arm 306 rotates substantially freely around loading arm pivot 444, which is suitably located between loading lever roller 436 and biasing surface 446. Loading arm pivot 444 may be located, however, at any position to facilitate the transfer of force from biasing surface 446 to loading lever roller 436 and vice versa.

Biasing surface 446 suitably comprises any surface against which force may be applied to bias loading lever roller 436 against rocker arm 304. For example, biasing surface 446 suitably comprises a substantially flat surface against which biasing mechanism 402 abuts. Force applied to biasing surface 446 creates torque around loading arm pivot 444, thus forcing loading lever roller 436 towards rocker arm 304.

To bias loading arm 306 towards rocker arm 304, biasing mechanism 402 applies force to biasing surface 446. Biasing mechanism 402 may comprise any device suitable for applying force to loading arm 306, such as a coil spring, a belleville spring, a leaf spring, an elastic material, or other energy absorbing device. In the present embodiment, biasing mechanism 402 comprises a compressed coil spring 450 disposed between loading arm biasing surface 446 and output arm 308. The characteristics of biasing mechanism 402 may be selected according to the desired force to switch coupler/decoupler 202 from lock-in position to lock-out position. Thus, the force required at input lever 302 to switch the coupler/decoupler 202 from lock-in position to lock-out position may be adjusted by selecting a biasing mechanism 402 to provide a corresponding force against loading arm 306.

Output arm 308 suitably comprises an output connector 460, an output pivot 462, and a bias mechanism connector 464. In the present embodiment, output arm 308 is pivotably mounted on output pivot 462. Output pivot 462 is suitably coaxial with decoupler pivot 322 and loading arm pivot 444. Output arm 308 may, however, be mounted relative to the other components in any manner which allows the transfer of force from input lever 302 to output arm 308 and facilitates switching from the lock-in position to the lock-out position.

Bias mechanism connector 464 engages output arm 308 with biasing mechanism 402. Bias mechanism connector 464 suitably comprises any connector for maintaining contact with biasing mechanism 402 so that biasing mechanism 402 forces bias mechanism connector 464 away from loading arm 306. In the present embodiment, bias mechanism connector 464 suitably comprises a plate attached to the main body of output arm 308 against which compressed spring 450 abuts.

Output connector 460 suitably provides an interface with the system to be controlled, for example the flight actuator 106 through 108 or 109 so that output connector 460 transfers force applied to output arm 308 to the flight actuator 106. In particular, output connector 460 suitably comprises a pivotable connector to flight actuators, such as blade pitch actuators. Output connector 460, however, suitably comprises any appropriate connector for transferring force from output arm 308 to the system to be controlled.

Sensor 310 is associated with coupler/decoupler 202 to detect when coupler/decoupler 202 switches from the lock-in position to the lock-out position. Sensor 310 suitably comprises any sort of sensor for detecting the switch to lock-out position and emitting a signal. In particular, sensor 310 may comprise an electrical, optical, or mechanical sensor to sense the switch to lock-out position and suitably provides a signal, such as an optical or electrical signal, which initiates activation of the backup actuator control system 206, 207.

In the present embodiment, sensor 310 comprises a switch, such as a rotary, voltage differential transducer (RVDT) 470, which detects motion of rocker arm 304 relative to output arm 308. For example, RVDT 470 is suitably fixed to output arm 308, and includes a coupling that allows for nonconcentricity protruding through a hole (not shown) formed in output arm 308. The RVDT shaft is suitably attached to rocker arm pivot 430 so that the shaft rotates as rocker arm 304 rotates around rocker arm pivot 430. As the shaft of RVDT 310 rotates with respect to the fixed portion of RVDT 310, RVDT 310 generates a voltage. At a preselected voltage level, RVDT 310 suitably activates the backup control system. In the present embodiment, RVDT 310 is configured to activate the backup actuator control system 206 when rocker arm 304 switches to the lock-out position.

In the lock-in position, force applied to input lever 302 is applied substantially directly to output arm 308. Force applied to input lever 302 is transferred to rocker arm 304 through bell crank detent 428 and rocker arm roller 432, which pushes against loading arm 306. Loading arm 306 transfers the force to output arm 308 through biasing mechanism 402, and output arm 308 transfers the force to the primary actuator control system 108. Thus, in the lock-in position, coupler/decoupler 202 operates as a substantially rigid component for transferring force from the pilot's controls 102 to the flight actuators 106.

If output arm 308 meets substantial resistance from the primary actuator control system 108, for example due to a jammed actuator, coupler/decoupler 202 switches to the lock-out position and sends a signal to activate the backup actuator control system 206. In particular, force applied to input lever 302 is transferred to rocker arm 304. Because the primary actuator control system 108 is jammed, however, output arm 308 is immobilized and cannot react to the force. As a result, spring 450 compresses in response to the force applied by output arm 308 in response to the force transferred through loading arm 306. When the spring 450 compresses beyond a selected threshold, loading lever roller 436 rolls over to lock-out cam surface 442, switching coupler/decoupler 202 to the lock-out position. With the removal of resistance from the primary actuator control system 108 in the lock-out position, input lever 302 moves substantially freely, thus decoupling input lever 302 from the primary actuator control system 108. In addition, as rocker arm 304 pivots from the lock-in position to the lock-out position, rocker arm pivot 430 rotates the shaft of RVDT 470, causing RVDT 470 to generate an electrical signal and initiate activation of the backup actuator control system 206. Thus, the pilot can continue to move the controls and guide the craft in conjunction with the backup actuator control system 206, 207, 208.

When coupler/decoupler 202 switches to the lock-out position, it does not return to the lock-in position until coupler/decoupler 202 is reset. To re-engage the primary actuator control system 108, for example after landing and repairing the primary actuator control system 108, coupler/decoupler 202 is suitably reset to its normal condition in order to prepare the helicopter 100 for the next needed activation of the backup actuator control system 206. Coupler/decoupler 202 may be equipped with a reset mechanism, which suitably comprises any system for allowing coupler/decoupler to be selectively reset to the lock-in position. For example, a suitable reset mechanism comprises an eccentric bolt 474 rotatably disposed through a hole formed in output arm 308 and a reset spring 476. Eccentric bolt 474 suitably includes an eccentric outer surface such that the surface spirals away from eccentric bolt's 474 rotation axis. The outer surface of eccentric bolt 474 suitably engages a cuff 478 formed in the perimeter of loading arm 306. Eccentric bolt 474 further suitably includes a mechanism, such as a slot or other recess, for engaging a tool to turn eccentric bolt 474. As eccentric bolt 474 is turned, the outer surface engages cuff 478 formed in loading arm 306. As the surface of eccentric bolt 474 contacting loading arm 306 spirals away from eccentric bolt's 474 rotation axis, eccentric bolt 474 forces loading arm 306 to move against the force exerted by biasing mechanism 402 and move load lever roller 436 away from rocker arm 304 and cam surface 440.

Reset spring 476, such as a compressed coil spring, is suitably connected to rocker arm 304 and output arm 308. Reset spring 476 biases rocker arm 304 towards input lever 302, though preferably with relatively little force. The force exerted by reset spring 476 may be sufficiently low compared to that of biasing mechanism 402 that its effect on the force required on input lever 302 to cause the switch to lock-out position is negligible. When eccentric bolt 474 forces loading lever roller 436 away from cam surface 434, however, reset spring 476 pushes rocker arm 304 towards input lever 302. Consequently, as load lever roller 436 moves away from cam surface 434, rocker arm 304 returns to the lock-in position. When eccentric bolt 474 completes its rotation, loading arm 306 is released and load lever roller 436 returns to engage lock-in cam surface 440 and bias rocker arm 304 towards input lever 302. As a result, coupler/decoupler 202 is reset in the lock-in position.

It should be noted that alternative embodiments of the reset mechanism may be applied to reset coupler/decoupler 202. For example, the reset mechanism suitably comprises any mechanism which provides for overriding the force applied by biasing mechanism 402 to separate load lever roller 436 from cam surface 434 and return rocker arm 304 to its lock-in position.

In addition, the present invention may be implemented in various applications and ways other than the embodiments discussed above. While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

I claim:

1. A decoupler system configured to selectively engage and disengage a first responsive system and a second responsive system to and from an input source, comprising:

an input arm configured to receive a force from the input source;

a force sensor having a threshold configured to automatically disengage the first responsive system and activate the second responsive system only when a magnitude of said force exceeds said threshold;

an output system configured to transfer said force to the first responsive system while said magnitude of said force remains below said threshold; and a transfer mechanism configured to transfer said force to the second responsive system after said force sensor activates the second responsive system.

2. The decoupler system of claim 1, wherein:

said input arm includes:
an input source connector; and
a transfer surface having a detent formed therein; and said force sensor includes a roller disposed within said detent, wherein said roller is configured to roll out of said detent when said magnitude of said force exceeds said threshold.

3. The decoupler system of claim 2, wherein said force sensor further comprises a rocker arm, wherein said roller is mounted on said rocker arm and said rocker arm is biased toward said input arm while said magnitude of said force remains below said threshold.

4. The decoupler system of claim 3, wherein said force is transferred from said input arm to said output system through said roller.

5. The decoupler system of claim 3, wherein:

said output system includes a biasing mechanism configured to apply a bias to said rocker arm; and said rocker arm includes:
a rocker pivot, wherein said rocker arm is mounted on said rocker pivot so that said rocker arm may pivot about said rocker pivot; and
a biasing surface, including:
a lock-in biasing surface, wherein said biasing mechanism applies said bias to said lock-in biasing surface while said magnitude of said force remains below said threshold; and
a lock-out biasing surface, wherein said biasing system applies said bias to said lock-out biasing surface when said magnitude of said force exceeds said threshold.

6. The decoupler system of claim 5, wherein said output system includes:

a loading arm, including:
roller abutting said rocker arm biasing surface; and
a loading arm biasing connector; and an output arm configured to transfer said force to said first responsive system while said magnitude of said force remains below said threshold, said output arm including an output biasing connector, wherein said biasing mechanism engages said loading arm biasing connector and said output biasing connector, wherein said biasing mechanism is configured to apply a force to said loading arm relative to said output arm, and wherein said threshold corresponds to the magnitude of the force applied by said biasing mechanism.

7. A decoupler system configured to selectively disengage a responsive system from an input source, comprising:

an input lever configured to receive a force from the input source;

a force sensor responsive soley to said force received by said input lever and having a first position and a second position, wherein said force sensor remains in said first position while said force remains below a selected threshold, and automaticaly moves to said second position when said force exceeds said selected threshold; and an output mechanism responsive to said input lever and said force sensor, wherein said output mechanism is configured to transfer force from said input lever to the responsive system only when said force sensor is in said first position.

8. The decoupler system of claim 7, wherein:

said input lever includes a roller surface having a detent formed therein; and said force sensor includes a roller configured to engage said input lever roller surface.

9. The decoupler system of claim 8, wherein:

said force sensor further includes a rocker arm, wherein said roller is mounted on said rocker arm, and said rocker arm further comprises a first biasing surface abutting said output mechanism when said force sensor is in said first position, wherein said rocker arm is configured to transfer a biasing force applied to said first biasing surface by said output mechanism to said roller so that said roller is biased against said roller surface; and said output mechanism is configured to apply said biasing force to said rocker arm first biasing surface when said force sensor is in said first position.

10. The decoupler system of claim 9, wherein said rocker arm further comprises a second biasing surface abutting said output mechanism when said force sensor is in said second position, wherein said rocker arm is configured to transfer said biasing force applied to said second biasing surface by said output mechanism to said roller so that said roller is biased away from said roller surface.

11. The decoupler system of claim 7, wherein said force sensor includes a position sensor configured to detect a switch of said force sensor between said first and second positions, and generate a signal upon detection of said switch.

12. The decoupler system of claim 11, wherein said position sensor includes a rotary voltage differential transducer (RVDT).

13. The decoupler system of claim 9, wherein said output mechanism includes:

a loading arm, including:
a roller abutting said rocker arm when said force sensor is in said first position; and
a loading biasing connector;

an output arm configured to transfer force to said responsive system and including an output biasing connector; and a biasing mechanism engaging said loading biasing connector and said output biasing connector, wherein said biasing mechanism is configured to apply a force to said loading arm relative to said output arm, and wherein said threshold corresponds to the magnitude of the force applied by said biasing mechanism.

14. The decoupler system of claim 13, wherein said biasing mechanism comprises a spring.

15. A helicopter guidance system for facilitating guidance of a helicopter by an operator, comprising:
- a human interface for receiving control signals from the operator;
- a flight actuator configured to affect a flight behavior of the helicopter in accordance with said control signals;
- a first actuator control system connected to said flight actuator configured to transmit said control signals to said flight actuator;
- a second actuator control system connected to said flight actuator configured to transmit said control signals to said flight actuator; and
- a decoupler connected to said human interface configured to receive said control signals from said human interface and selectively transmit said control signals to one of said first actuator control system and said second actuator control system, including:
  - an input connector connected to said human interface configured to receive said control signals from said human interface;
  - a sensor connected to said input connector and responsive to said control signals received by said input connector and having a first position and a second position, wherein said sensor remains in said first position while said control signals remain within a selected range, and moves to said second position when said force exceeds said selected range; and
  - an output mechanism configured to receive control signals from said input connector and responsive to said input connector and said sensor, wherein said output mechanism is configured to transmit control signals from said input connector to said first actuator control system when said sensor is in said first position and to said second actuator control system when said sensor is in said second position.

16. The helicopter guidance system of claim 15, wherein said first actuator control system is a mechanical system.

17. The helicopter guidance system of claim 16, wherein said second actuator control system is an electrical system.

18. The helicopter guidance system of claim 15, wherein said first actuator control system is an electrical system.

19. The helicopter guidance system of claim 18, wherein said second actuator control system is a mechanical system.

20. The helicopter guidance system of claim 15, wherein:

said input connector includes a roller surface having a detent formed therein; and said sensor includes a roller configured to engage said input connector roller surface.

21. The helicopter guidance system of claim 20, wherein:

said sensor further includes a rocker arm, wherein said roller is mounted on said rocker arm, and said rocker arm further comprises a first biasing surface abutting said output mechanism when said sensor is in said first position, wherein said rocker arm is configured to transfer a biasing force applied to said first biasing surface by said output mechanism to said roller so that said roller is biased against said roller surface; and said output mechanism is configured to apply said biasing force to said rocker arm first biasing surface when said sensor is in said first position.

22. The helicopter guidance system of claim 21, wherein said rocker arm further comprises a second biasing surface abutting said output mechanism when said sensor is in said second position, wherein said rocker arm is configured to transfer said biasing force applied to said second biasing surface by said output mechanism to said roller so that said roller is biased away from said roller surface.

23. The helicopter guidance system of claim 15, wherein said sensor includes a position sensor configured to detect a switch of said sensor between said first and second positions, and generate a signal upon detection of said switch.

24. The helicopter guidance system of claim 23, wherein said position sensor includes a rotary voltage differential transducer (RVDT).

25. The helicopter guidance system of claim 15, wherein said output mechanism includes:
- a loading arm, including:
  - a roller abutting said rocker arm when said sensor is in said first position; and
  - a loading biasing connector;
- an output arm configured to transfer control signals to said first actuator control system system and including an output biasing connector; and
- a biasing mechanism engaging said loading biasing connector and said output biasing connector, wherein said biasing mechanism is configured to apply a force to said loading arm relative to said output arm, and wherein said range corresponds to the magnitude of the force applied by said biasing mechanism.

26. The helicopter guidance system of claim 25, wherein said biasing mechanism comprises a spring.

* * * * *